United States Patent
Kues et al.

(10) Patent No.: US 11,969,755 B2
(45) Date of Patent: Apr. 30, 2024

(54) METHOD FOR APPLYING EMBOSSED STRUCTURES TO COATING MEDIA WHILE PRE-TREATING THE EMBOSSING TOOL USED THEREFOR

(71) Applicant: BASF Coatings GmbH, Münster (DE)

(72) Inventors: Jan-Bernd Kues, Münster (DE); Susanne Piontek, Münster (DE); Joerg Exner, Münster (DE); Birgit Kleine-Bley, Münster (DE); Alberto Garcia Martin, Münster (DE); Jens-Henning Noatschk, Münster (DE); Michael Lorenz, Leipzig (DE); Robert Von Der Aa, Borsdorf (DE); Frank Bergmann, Halle (DE); Wilfried Schipper, Sandesneben (DE)

(73) Assignee: BASF COATINGS GMBH, Muenster (DE)

( * ) Notice: Subject to any disclaimer, the term of this patent is extended or adjusted under 35 U.S.C. 154(b) by 16 days.

(21) Appl. No.: 17/615,986

(22) PCT Filed: Jun. 3, 2020

(86) PCT No.: PCT/EP2020/065316
§ 371 (c)(1),
(2) Date: Dec. 2, 2021

(87) PCT Pub. No.: WO2020/245172
PCT Pub. Date: Dec. 10, 2020

(65) Prior Publication Data
US 2022/0314272 A1    Oct. 6, 2022

(30) Foreign Application Priority Data
Jun. 3, 2019 (DE) .................... 10 2019 003 847.9

(51) Int. Cl.
*B05D 3/12* (2006.01)
*B05D 1/02* (2006.01)
*C09D 133/04* (2006.01)

(52) U.S. Cl.
CPC .............. *B05D 3/12* (2013.01); *B05D 1/02* (2013.01); *C09D 133/04* (2013.01)

(58) Field of Classification Search
CPC .................................. B05D 3/12; B05D 1/02
See application file for complete search history.

(56) References Cited

U.S. PATENT DOCUMENTS

2001/0003010 A1*  6/2001  Pham .............. C23C 4/123
                                                        427/427
2007/0082176 A1*  4/2007  Schaefer ............ B32B 3/20
                                                        428/151

(Continued)

FOREIGN PATENT DOCUMENTS

JP    H03239510 A    10/1991
JP    H11156869 A     6/1999

(Continued)

OTHER PUBLICATIONS

International Search Report for corresponding PCT/EP2020/065316 dated Oct. 14, 2020, 3 Pages.

*Primary Examiner* — Nathan T Leong
(74) *Attorney, Agent, or Firm* — Armstrong Teasdale LLP

(57) ABSTRACT

Described herein are a method for transferring an embossed structure, which includes at least the steps (1-i) and (2-i) or (1-ii) and (2-ii), where steps (1-i) and (2-i) or (1-ii) and (2-ii) are carried out using an embossing tool (P1) including at least one embossing die (p1), where the embossing die (p1) of the embossing tool (P1) is pretreated, before the implementation of step (2-i) or before the implementation of step (1-ii), with at least one organic solvent and/or at least one reactive diluent, and also a method of using a corresponding (Continued)

pretreated embossing tool (P1) including at least one embossing die (p1) for the purpose of transferring an embossed structure in such a way.

17 Claims, 6 Drawing Sheets

(56) References Cited

U.S. PATENT DOCUMENTS

| | | | |
|---|---|---|---|
| 2012/0301569 A1* | 11/2012 | Hasegawa | B29C 59/04 425/385 |
| 2013/0101796 A1 | 4/2013 | Arzt et al. | |
| 2013/0140744 A1 | 6/2013 | Nakai et al. | |
| 2014/0110371 A1* | 4/2014 | Maki | B29C 33/58 216/9 |
| 2017/0066207 A1 | 3/2017 | Hayashi et al. | |

FOREIGN PATENT DOCUMENTS

| | | |
|---|---|---|
| JP | 201693962 A | 5/2016 |
| WO | 2012074702 A1 | 6/2012 |

* cited by examiner

METHOD FOR APPLYING EMBOSSED STRUCTURES TO COATING MEDIA WHILE PRE-TREATING THE EMBOSSING TOOL USED THEREFOR

CROSS-REFERENCE TO RELATED APPLICATIONS

This application is a U.S. National Phase Application of International Patent Application No. PCT/EP2020/065316, filed Jun. 3, 2020, which claims priority to German Patent Application No. 102019003847.9, filed Jun. 3, 2019, the entire contents of which are hereby incorporated by reference herein.

The present invention relates to a method for transferring an embossed structure, which comprises at least the steps (1-*i*) and (2-*i*) or (1-*ii*) and (2-*ii*), where steps (1-*i*) and (2-*i*) or (1-*ii*) and (2-*ii*) are carried out using an embossing tool (P1) comprising at least one embossing die (p1), where the embossing die (p1) of the embossing tool (P1) is pretreated, before the implementation of step (2-*i*) or before the implementation of step (1-*ii*), with at least one organic solvent and/or at least one reactive diluent, and also to a use of a corresponding pretreated embossing tool (P1) comprising at least one embossing die (p1) for the purpose of transferring an embossed structure in such a way.

PRIOR ART

In many applications within industry it is nowadays customary to provide workpieces on their surface with structures whose structural features are in the micrometer range or even in the nanometer range. Such structures are also referred to as microstructures (structures with features in the micrometer range) or nanostructures (structures with features in the nanometer range). Such structures are used, for example, to influence optical, bionic and/or tactile qualities of surfaces of materials. Structures of this kind are also referred to as embossments or embossed structures.

One common method here is to transfer these structures into a coating material. Transfer of the structures into the coating material is frequently achieved here with an embossing operation wherein a die containing, on an embossed surface or transfer surface, the microstructures and/or nanostructures to be formed, in a negative form, is brought into contact with and impressed into the coating material. In order then for the structures to be permanently formed and maintained on the surface of the workpiece, the coating material is cured typically in situ.

Particularly in the area of tactility and bionics, microstructures especially in the range of >40 μm with an aspect ratio >1 are generated here. The aspect ratio denotes the ratio of the height of a structure to its diameter. The structural elements of the fine structure of a lotus flower are for example around 10-20 μm high and around 10-15 μm wide, and the structural elements of the fine structure of a gecko's foot are around 100 μm high and around 1 μm wide (cf. E. Arzt et al., PNAS 2003, 100, 10603-10606).

DE 10 2004 012 067 A1 describes a method for producing adhesion elements on a carrier material, using plastics materials such as elastomers, which have structures in the micrometer range.

WO 2005/047549 A1 describes fine-fibered surfaces of velour type which may have fine structures in the form of elevations having a length of 110 μm and a diameter of 3-60 μm. In order to generate such finely structured, velourlike surfaces, a polymer dispersion is applied to a carrier surface with corresponding negative structure and is cured, and so the coating material takes on the fine structuring. One of the disadvantages of the method is that it involves a discontinuous operation.

DE 10 2007 061 980 A1 discloses a method for generating a microstructure, by providing a molding tool in the form of a polymeric film in web form, the surface of said film bearing an arrangement of elevations and indentations in the form of the desired microstructure, and filling the indentations with a curable first coating material, contacting the surface of the polymeric film with a layer of a curable second coating material, curing the first coating material, in contact with the second coating material, in the indentations in the polymeric film, together with the layer of the second coating material, and at the same time joining it to the layer of second coating material, and removing the surface of the polymeric film from the second cured coating material again, so that the cured first coating material joined to the second coating material is pulled out of the indentations in the polymeric film. The method is employed for producing security elements having microoptical structures such as microoptical Moiré enlargement arrangements. The structure depth of the microstructure according to DE 10 2007 061 980 A1 is in a range from 1 up to a maximum of 20 μm.

Continuous methods for transferring embossed structures to coating materials, in which, for example, a roll-to-roll printing machine is equipped with an embossing device which carries a negative structure on its surface, and in which this structure is transferred to a coating material, are known in the prior art, especially in the field of the production of optical films and in the field of security printing (holograms). For an economic operation with very high impression accuracy (extremely precise replication of the negative structure without major losses), the use of coating materials, especially radiation-curable materials, has been found to be particularly advantageous. With such coating materials, it becomes possible for the liquid coating material employed to be at least partially cured while it is still in contact with the embossing tool, such as an embossing roll, so achieving high structural accuracy at high belt speeds. Methods of this kind are described for example in WO 88/09252 A1 and WO 94/18609 A1. In WO 2009/121357 A1, as well, a method of this kind for generating optical films is disclosed, wherein the coating material is first applied to a carrier film via known application methods, and is subsequently embossed. A comparable method is also described, for example, in DE 41 32 476 A1.

Disadvantages of these known aforesaid methods, however, are firstly that the coating material, at least in some of these methods, is first applied to the embossing tool and is then transferred from there to the substrate. This imposes restrictions on these methods in terms of the desired layer thickness of the coating material, meaning that embossed structures with a structure depth >40 μm are not sufficiently impressed. Another disadvantage of these known aforesaid methods is that they are not adequately capable of transferring embossments, especially in the micrometer range, without an accompanying reduction overall in the impression accuracy to an unacceptable degree, this being the case especially when the intention is to impress embossed structures having a structure depth >40 μm. An increase in the pressure with which the embossing tool used is pressed onto the coating material is unable to result in increased impression accuracy, since it is often accompanied by jamming/latching of the embossing die of the embossing tool in the embossed coating, meaning that a higher force is necessary to separate the coated substrate with such fine structuring from the embossing tool. This may in turn result in at least separate structural elements of this fine structuring being destroyed by tearing and/or by cohesive fracture during the separation process, especially when the negative structure within the embossing die is completely filled out. As a result, not only is the embossed structure not correctly embossed, but additionally the embossing tool is contaminated, necessitating costly and inconvenient cleaning or renewal. Moreover, if the pressure during the embossing operation is increased, i.e., if the applied pressing pressure is raised, there is the risk of the coating material used being pressed insufficiency into the indentations of the embossing die, since the coating material is displaced at the sides or at the margin of the substrate coated with it. Moreover, the air which remains in the holes in the embossing die cannot be compressed to any degree, and so often the impressions do not correspond to the form dictated by the die, and there may be unwanted cratering as a result. Particularly as a result of large enclosed air bubbles, the stability of the embossing structure typically becomes much poorer, resulting in low abrasion resistance in the face of even low mechanical loading of the surface.

There is therefore a need for a method for transferring embossed structures that does not have the aforesaid disadvantages.

Problem

A problem addressed by the present invention is therefore that of providing a method for transferring embossed structures, particularly those with a high aspect ratio, from an embossing tool to coating compositions, and to substrates bearing such coating compositions, and more particularly a method of this kind which allows the transfer of corresponding microstructures and/or nanostructures, especially microstructures, which permits sufficient impression accuracy in the transfer of the embossed structures, so that embossing is not accompanied by loss of any depth of modulation, and which enables in particular the generation of a very largely reusable embossing die for transferring the embossed structures, and/or which can be carried out using an embossing die of this kind. At the same time, and in particular, it is to be possible for the embossing structures that are to be transferred to be replicated to an extremely high degree and, as far as possible without defect, possible to be transferred more particularly without the incidence of craters, without the method featuring any disadvantages brought about in particular by unwanted or inadequate properties on the part of the coatings and coating compositions used, such as insufficient adhesion, for example.

Solution

This problem is solved by the subject matter claimed in the claims and by the preferred embodiments of this subject matter that are described in the description that follows.

A first subject of the present invention is therefore a method for transferring an embossed structure using an embossing tool (P1), which comprises at least the steps (1-*i*) and (2-*i*) or (1-*ii*) and (2-*ii*), specifically (1-*i*) applying a coating composition (B1*a*) to at least a part of a surface of a substrate (F1), to give a composition (B1*a*F1), and (2-*i*) at least partially embossing the coating composition (B1*a*), applied at least partially to the surface of the substrate (F1), by means of at least one embossing tool (P1) comprising at least one embossing die (p1), or (1-*ii*) applying a coating composition (B1*a*) to at least a part of an at least partially embossed surface of an embossing die (p1) of an embossing tool (P1) and (2-*ii*) applying a substrate (F1) to at least a part of the surface of the coating composition (B1*a*), applied to the embossing die (p1), to give a composite (B1*a*F1) on (p1), which comprises pretreating the at least one embossing die (p1) of the embossing tool (P1), before the implementation of step (2-*i*) and before the implementation of step (1-*ii*), with at least one organic solvent and/or at least one reactive diluent, and, preferably through step (2-*i*) and step (1-*ii*), transferring microstructures having a structure depth >30 µm as embossed structure onto the coating composition (B1*a*).

A further subject of the present invention is a use of an embossing tool (P1) comprising at least one embossing die (p1) for transferring an embossed structure to at least a part of a surface of a coating composition (B1*a*), wherein the at least one embossing die (p1) of the embossing tool (P1) has been pretreated, before the transfer, with at least one organic solvent and/or at least one reactive diluent, and the embossed structure transferred onto the coating composition (B1*a*) preferably comprises microstructures having a structure depth >30 µm.

It has surprisingly been found that the method of the invention—and especially the pretreatment to be carried out before the implementation of step (2-*i*) and before the implementation of step (1-*ii*)—makes it possible to transfer embossed structures, especially microstructures, in a very high impression accuracy even at high speed to the coating composition that is to be embossed, so that there is no loss of depth of modulation during embossing. It has been found especially surprisingly here that the method of the invention makes it possible to transfer microstructures as embossed structures having structure depths >30 µm, more particularly >40 µm, and aspect ratios >1 with accurate form and with high speed from an embossing tool, which carries on its surface the negative structure of the embossed structure to be transferred, to a coating material.

More particularly it has emerged, surprisingly, that the use of conventional methods, known from the prior art, for the transfer of embossed structures, especially tactile embossed structures, leads to only incomplete impression, meaning that the surface structure on the coating material does not adequately correspond to the positive of the negative on the embossing device, since often the arrangement and dimensions of the individual structural elements of the negative of the embossing structure to be transferred ensure that during the embossing operation it is impossible for the air to escape to the sides and the air therefore frequently remains in the indentations as a spacer between coating material and the lowermost point of the respective structural elements, causing in particular the peaks not to be modeled and the individual structural elements transferred to have craters. These disadvantages are surprisingly circumvented by the method of the invention and particularly the pretreatment which is to take place before the implementation of step (2-*i*) and before the implementation of step (1-*ii*). Surprisingly it has emerged in particular in this context that even with a comparatively high structure depth and comparatively high aspect ratio on the part of the embossed structures to be transferred, it is possible to transfer, with high impression accuracy, exactly those structures which have individual structural elements which are not joined to one another but instead are present at least partly in the form of individual "holes" on the surface of the embossing die of the embossing tool. Although in the case of such an arrangement of the structural elements within the embossing die the air during the embossing operation is unable to escape to the sides, but must instead be displaced from the individual structural elements ("holes"), the method of the invention surprisingly allows defect-free transfer of the embossed structure, in particular without cratering.

DETAILED DESCRIPTION

The term "comprising" in the context of the present invention, in connection with the coating compositions used in the invention such as the coating composition (B1*a*), for example, and with the method of the invention and the method steps therein preferably has the meaning of "consisting of". Here it is possible, for example, in relation to the coating composition (B1*a*) used in the invention, for said composition to include not only the components contained therein such as the components (a) and/or (b) and/or (c) but also one or more of the further components identified below and present optionally in the coating composition (B1*a*) used in the invention. Each of the components may be present in their preferred embodiments specified below. In relation to the method of the invention, this method may comprise not only the steps (1-*i*) and (2-*i*) or (1-*ii*) and (2-*ii*) and the pretreatment step but also further, optional method steps, such as steps (3) and (4), for example.

Method of the invention for transferring an embossing structure, comprising at least steps (1-*i*) and (2-*i*) or (1-*ii*) and (2-*ii*) and also optionally (3) and optionally (4)

Figure 1:
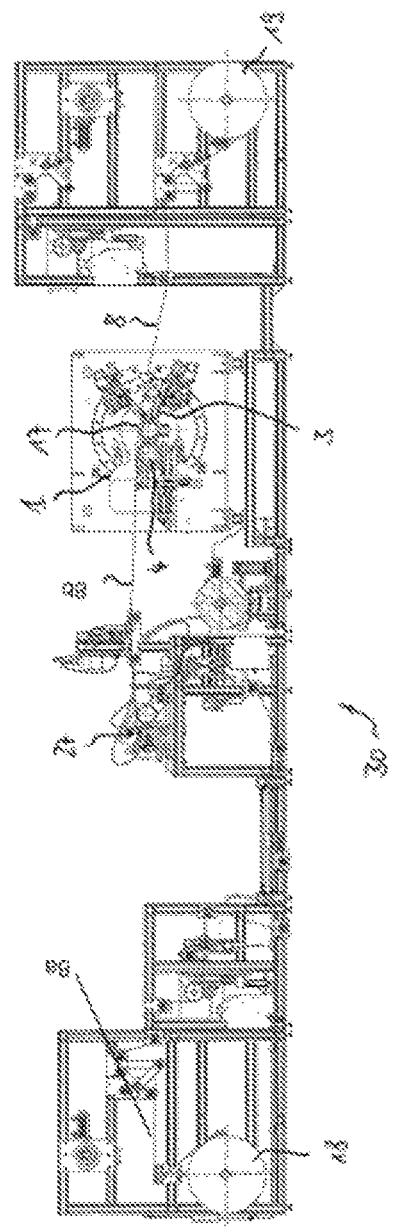
FIG. 1 shows schematically a side view of an apparatus which can be used to implement steps (1-*i*) and (2-*i*) and also optionally (3) and optionally (4) of the method of the invention, and which is used for exemplary illustration of the method of the invention.
Figure 2:
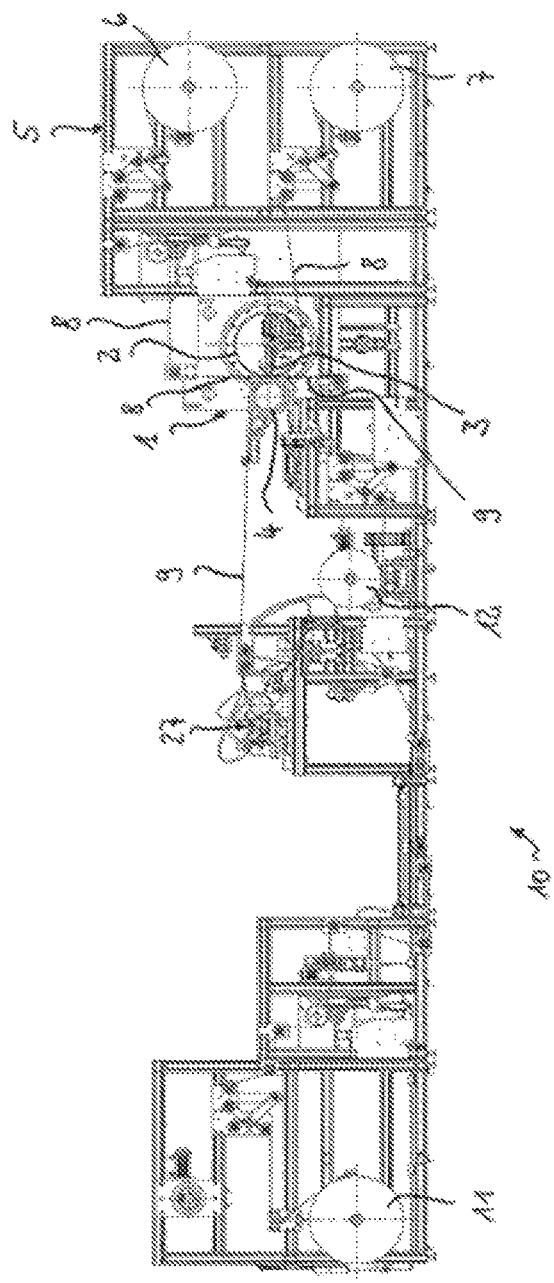
FIG. 2 shows schematically a side view of an apparatus which can be used for implementing steps (1-*i*) and (2-*i*) and also optionally (3) and optionally (4) of the method of the invention, and which is used for exemplary illustration of the method of the invention.

A first subject for the present invention is, as stated above, the method of the invention for transferring an embossed structure to at least a part of a surface of a coating composition (B1*a*). FIG. 1 and FIG. 2 provide exemplary illustrations of the steps (1-*i*) and (2-*i*) and also optionally (3) and optionally (4) of the method of the invention, as is also evident from the description of these figures below. The method of the invention necessarily comprises the aforesaid pretreatment.

The method of the invention is preferably a continuous method.

The embossed structure is transferred/obtained by the at least partial embossing of the coating composition (B1*a*), applied at least partially to the surface of the substrate (F1), in method step (2-*i*). An alternative possibility is that of transfer by means of method steps (1-*ii*) and (2-*ii*). The term "embossing" refers to the at least partial furnishing of the coating composition (B1*a*), optionally as part of a composite (B1*a*F1), on at least a part of its surface, with an embossed structure. In this case at least a certain area of the coating composition (B1*a*) is furnished with an embossed structure. With preference the entire surface of the coating composition (B1*a*), optionally as part of the composite (F1B1*a*), is furnished with an embossed structure.

The embossed structures of the composites (F1B1*a*) and (F1B1) are based preferably and in each case independently of one another on a repeating and/or regularly arranged pattern. The structure in each case may be a continuous embossed structure such as a continuous groove structure or else a plurality of preferably repeating individual embossed structures. The respective individual embossed structures in this case may in turn be based preferably on a groove structure having more or less strongly pronounced ridges (embossed elevations) defining the embossed height of the embossed structure. In accordance with the respective geometry of the ridges of a preferably repeating individual embossed structure, a plane view may show a multiplicity of preferably repeating individual embossed structures, each of them different, such as, for example, preferably serpentine, sawtooth, hexagonal, diamond-shaped, rhomboidal, parallelogrammatical, honeycomb, circular, punctiform, star-shaped, rope-shaped, reticular, polygonal, preferably triangular, tetragonal, more preferably rectangular and square, pentagonal, hexagonal, heptagonal and octagonal, wire-shaped, ellipsoidal, oval and lattice-shaped patterns, it also being possible for at least two patterns to be superimposed on one another. The ridges of the individual embossed structures may also have a curvature, i.e., a convex and/or concave structure.

The respective embossed structure may be described by its width such as the width of the ridges, in other words by its structural width, and by the height of the embossments, in other words by its structure height (or structure depth). The structure width such as the width of the ridges may have a length of up to one centimeter, but is preferably situated in a range from 10 nm to 1 mm. The structure height is situated preferably in a range from 0.1 nm to 1 mm. Preferably, however, the respective embossed structure represents a microstructure and/or nanostructure. Microstructures here are structures—in terms both of structure width and structure height—having features in the micrometer range. Nanostructures here are structures—in terms both of structure width and structure height—having features in the nanometer range. Microstructures and nanostructures here are structures which have a structure width in the nanometer range and a structure height in the micrometer range or vice versa. The terms "structure height" and "structure depth" are interchangeable here.

The structure width of the respective embossed structure is preferably situated in a range from 10 nm to 500 μm, more preferably in a range from 25 nm to 400 μm, very preferably in a range from 50 nm to 250 μm, more particularly in a range from 100 nm to 100 μm. The structure height of the respective embossed structure is preferably situated in a range from 10 nm to 500 μm, more preferably in a range from 25 nm to 400 μm, very preferably in a range from 50 nm to 300 μm, more particularly in a range from 100 nm to 200 μm. This is so for the embossed structures both of the composite (F1B1) and of the composite (F1B1*a*).

The embossed structures transferred by means of the method of the invention are very preferably microstructures. The structure width is preferably situated in a range from 1 μm to 500 μm, more preferably in a range from 2 μm to 400

µm, very preferably in a range from 5 µm to 250 µm, more particularly in a range from 10 µm to 100 µm. The structure height of the respective embossed structure is preferably situated in a range from 1 µm to 500 µm, more preferably in a range from 2 µm to 400 µm, very preferably in a range from 5 µm to 300 µm, more particularly in a range from 10 µm to 200 µm. With particular preference the embossed structures to be transferred at least partially have a structure depth (structure height) >10 µm or >20 µm, very preferably >30 µm or >40 µm, more particularly >45 µm or >50 µm. The maximum structure depth here is preferably in each case 500 µm or 450 µm or 400 µm or 300 µm or 250 µm.

The aspect ratio of the embossed structure transferred onto the coating composition (B1a) is preferably >1. The term "aspect ratio" is known to the skilled person. The aspect ratio describes the ratio of the height (depth) of a structural element to its lateral extent (width). For example, periodically arranged rectangles which have a height of 10 µm and a width of 5 µm have an aspect ratio of 2 (10:5). The greater the value of the aspect ratio, the more difficult it is in general to produce the correspondingly structured surface. The aspect ratio of the embossed structure transferred onto the coating composition (B1a) is preferably >2 or >3 or >5 or >10, more preferably >15 or >20 or >50. In the case of hierarchical structures, the aspect ratio indicates the aspect ratio of the largest hierarchical stage.

The structure width and structure height of the respective embossed structure are determined here by mechanical scanning of the surface. In this case the embossed height is measured at not less than 10 points on a line, distributed uniformly over the web width of the sample, taking care to ensure that the scanning instrument does not compress the embossed structure. The determination of the structure height represents a determination of the impression accuracy and is accomplished by means of atomic force microscopy in accordance with the technique described below.

The method of the invention enables the implementation of the method at high operating speeds, preferably at speeds in the range from 1 to 150 m/min, more preferably from 1.5 to 100 m/min, very preferably from 2 to 75 m/min, more preferably still from 3 to 50 m/min, more particularly from 5 to 40 m/min, most preferably from 10 to 25 m/min. The operating speed here denotes preferably the belt speed with which the substrate (F1), at least partially coated with a coating composition (B1a), is moved during the implementation of the method of the invention, or with which the substrate (F1) as such is moved.

The coating (B1) of the composite (F1B1), and the coating composition (B1a) of the composite (F1B1a), and the at least one embossing die (p1) of the embossing tool (P1), preferably have embossed structures which are mirror images of one another.

Alternative (i) Comprising Steps (1-*i*) and (2-*i*)

The method of the invention as per alternative (i) comprises at least steps (1-*i*), (2-*i*) and also optionally (3) and optionally (4).

Step (1-*i*)

Step (1-*i*) of the method of the invention provides for application of a coating composition (B1a) to at least a part of a surface of a substrate (F1). The substrate (F1) represents a carrier material for the coating composition (B1a) to be applied thereto or the coating (B1) to be applied thereto.

The substrate (F1) or, if a coated substrate is used, the layer located on the surface of the substrate (F1) consists preferably of at least one thermoplastic polymer, selected more particularly from the group consisting of polymethyl (meth)acrylates, polybutyl (meth)acrylates, polyethylene terephthalates, polybutylene terephthalates, polyvinylidene fluorides, polyvinyl chlorides, polyesters, including polycarbonates and polyvinyl acetate, preferably polyesters such as PBT and PET, polyamides, polyolefins such as polyethylene, polypropylene, polystyrene, and also polybutadiene, polyacrylonitrile, polyacetal, polyacrylonitrile-ethylene-propylene-diene-styrene copolymers (A-EPDM), polyetherimides, phenolic resins, urea resins, melamine resins, alkyd resins, epoxy resins, polyurethanes, including TPU, polyether ketones, polyphenylene sulfides, polyethers, polyvinyl alcohols and mixtures thereof. Particularly preferred substrates or layers on the surface thereof are polyolefins such as, for example, PP (polypropylene), which may alternatively be isotactic, syndiotactic or atactic and may alternatively be unoriented or oriented through monoaxial or biaxial drawing, SAN (styrene-acrylonitrile copolymers), PC (polycarbonates), PMMA (polymethyl methacrylates), PBT (poly (butylene terephthalate(s)), PA (polyamides), ASA (acrylonitrile-styrene-acrylate copolymers) and ABS (acrylonitrile-butadiene-styrene copolymers), and also their physical mixtures (blends). Particularly preferred are PP, SAN, ABS, ASA and also blends of ABS or ASA with PA or PBT or PC. Very particular preference is given to PET, PBT, PP, PE and polymethyl methacrylate (PMMA) or impact-modified PMMA. Especially preferred used is a polyester, most preferably PET, as material for the substrate (F1). Alternatively the substrate (F1) itself—optionally in spite of a layer of at least one of the aforementioned polymers applied thereto—may be made of a different material such as glass, ceramic, metal, paper and/or fabric. In this case the substrate (F1) is preferably a plate and may be used, for example, in a roll-to-plate embossing apparatus.

The thickness of the substrate (F1) is preferably 2 µm to 5 mm. Particularly preferred is a layer thickness of 25 to 1000 µm, more particularly 50 to 300 µm.

The substrate (F1) is preferably a film, more preferably a film web, very preferably a continuous film web. In this case the substrate (F1) may be used preferably in a roll-to-roll embossing apparatus.

The term "continuous film" or "continuous film web" in the sense of the present invention refers preferably to a film having a length of 100 m to 10 km.

When step (1-*i*) is being carried out (and preferably also when steps (2-*i*), optionally (3) and optionally (4) of the method are being carried out, and also when steps (1-*ii*), (2-*ii*), optionally (3) and optionally (4) of the method of the alternative (ii) are being carried out), the substrate (F1) is preferably moving and is therefore a moving substrate. During the implementation of step (1-*i*) and (2-*ii*), the substrate (F1) is preferably moved by means of a transport device such as a conveyor belt. The corresponding apparatus used for implementing step (1-*i*) and also step (2-*ii*) therefore preferably comprises such a transport device. The corresponding apparatus used for carrying out step (1-*i*) further comprises a means for applying the preferably radiation-curable coating composition (B1a) to at least a part of a surface of the substrate (F1). Similar comments apply in respect of the corresponding apparatus used for implementing step (2-*ii*).

Step (2-*i*)

Step (2-*i*) of the method of the invention provides for at least partial embossing of the coating composition (B1a), applied at least partially to the surface of the substrate (F1), by means of at least one embossing tool (P1) comprising at least one embossing die (p1).

The embossing tool (P1) used may be a conventional printing cylinder which carries the negative form of the embossed structure to be embossed into the surface of the composite (F1B1a). This cylinder may be pressed onto the composite (F1B1a) for the at least partial embossing. As already mentioned, the at least one embossing die (p1) of the embossing tool (P1) used for the at least partial embossing has a "negative structure", in other words the mirror image of the embossing structure which is possessed by the composite (F1B1a) of a substrate (F1) and the at least partially embossed coating composition (B1a), this composite being obtained after implementation of step (2-i) of the method of the invention. The embossing tool (P1) is preferably a metallic embossing tool, more preferably made of nickel, steel or copper, in which case copper may—but need not— contain fractions of chromium. Accordingly, the embossing die (p1) is preferably metallic, more preferably made of nickel, optionally additionally containing fractions of phosphorus. Alternatively, however, it is also possible to use soft materials such as, for example, polydimethylsiloxanes (PDMS) for producing (p1).

In step (2-i) the at least one embossing die (p1) is preferably part of a first roll which functions as embossing tool (P1), and the composite (F1B1a) used for the at least partial embossing is guided via a second roll, which is opposite to and counter-rotary to the first roll. The at least partial embossing as per step (2) takes place preferably at the level of the roll nip, which is formed by the two mutually opposite, counter-rotating rolls. Preferably in this case the embossing die (p1) of the embossing tool (P1) is facing the coating composition (B1a) of the composite (F1B1a). The at least partially embossing here is achieved preferably by pressing of the embossing die (p1) onto the composite (F1B1a).

The embossing die (p1) used may alternatively be a composite (B2F2) composed of a substrate (F2) and of an at least partially embossed and at least partially cured coating (B2), which will be described in more detail below. In this case a composite (F1B1aB2F2) is obtained after the at least partial embossing. The embossing tool (P1) including the embossing die (p1) is preferably pressed at least partially onto the applied coating composition (B1a) during the implementation of step (2-i).

The embossing die (p1) of the embossing tool (P1) used in step (2-i) is preferably reusable and can be employed repeatedly for transferring at least one embossed structure, preferably within the method of the invention. Step (2-i) preferably transfers microstructures and/or nanostructures as embossed structure onto the coating composition (B1a).

The embossing die (p1), i.e. preferably in the case of the composite (F2B2), preferably comprises a film web (F2) which bears an at least partially embossed and at least partially cured coating (B2). With particular preference the substrate (F2) is a continuous film web which comprises the at least partially embossed and at least partial coating (B2), thus making the composite (F2B2) used as embossing die (p1) a continuous embossing die, this being so especially when the substrate (F1) as well is a continuous film web.

The at least one embossing die (p1) of the embossing tool (P1) used for the at least partial embossing as per step (2-i) has a "negative structure" ("negative shape") to the mirror image of the embossing structure possessed by the composite (F1B1), which is obtained after the implementation of optional step (4) of the method of the invention and which is composed of a substrate (F1) and of an at least partially embossed and at least partially cured coating (B1).

The corresponding apparatus used for implementing step (2-i) comprises a means for at least partially embossing the coating composition (B1a), applied at least partially to the surface of the substrate (F1), by means of at least one embossing tool (P1). Additionally, the apparatus used preferably has a means for pressing (P1) onto the substrate (F1), used preferably as continuous film web, after the application of the preferably radiation-curable coating composition (B1a) to (F1), this means being positioned preferably downstream—as viewed in the conveying direction of the substrate (F1)—of the means for applying the radiation-curable coating composition (B1a).

The at least partial embossing as per step (2-i) of the method of the invention is carried out by means of an embossing tool (P1). (P1) may preferably be an embossing calender, which preferably comprises a grid application mechanism, more preferably a grid roll mechanism. This calender possesses rolls which are counter-rotating or co-rotating and are disposed preferably one above another in the height direction with a defined spacing, and the composite (F1B1a) to be provided with an embossed structure is supplied to the rolls and passed through the roll nip which forms, the nip width being variably adjustable. The grid roll mechanism here preferably comprises a first roll such as a metallic roll, for example a steel roll or a nickel roll, or else a quartz-based roll or a roll coated with at least one plastic. The first roll functions as embossing roll (press roll). The grid roll mechanism here preferably comprises a second roll (pressure application roll or pressing roll). The first roll here acts as an embossing tool (P1) and contains the negative form of the embossed structure to be embossed into the surface of the composite (F1B1a). For this purpose, the embossing tool (P1) is preferably provided with a composite (F2B2) as embossing die (p1) which represents this negative shape. The negative shape of the structure to be embossed is produced on the embossing tool (P1) according to customary methods known to the skilled person; depending on structure and materials, specific methods may be particularly advantageous. With preference this is accomplished in accordance with the invention by the embossing roll acting as embossing tool (P1) and by the composite (F2B2) used preferably as embossing die (p1) being in the form of a coated and at least partly embossed film, preferably film web, more preferably continuous film web which preferably is moving. The composite (F1B1a) to be embossed is moved in the opposing direction by means of the pressure application roll. At the point of the roll nip, which is formed by the counter-rotating rolls arranged with a defined distance from one another, embossing takes place as per step (2-i). The first roll, which guides the embossing die (p1), serves here for embossing the composite (F1B1a), which is guided by the second roll opposite this embossing roll, and which presses the composite (F1B1a), to be provided with an embossing structure, against the first embossing roll. As already observed above, the structures on the embossing roll—that is, those of the embossing die (p1)—may either have a continuous structure or else may be designed as an interrupted structure (sequence of individual embossed structures), in which case a combination of both structures is also possible. The respective structures on the embossing roll may have any of a very wide variety of geometric shapes, according to the intended structure of the composite. If necessary, step (2-i) may be carried out at elevated temperature, e.g., at 30 to 100° C. or at least to 80° C. In this case, the composite (F1B1a) to be embossed passes first through a heating roll mechanism, after which there may be irradiation with infrared light, before the actual embossing operation described above takes place. After the embossing, the composite (F1B1a) that is then embossed runs optionally through a chill roll mechanism for cooling.

Alternatively, step (2-*i*) may also take place with cooling: In this case the composite (F1B1*a*) to be embossed runs first through a chill roll mechanism, before the actual embossing operation described above takes place.

The composite (F2B2) used as embossing die (p1) in step (2-*i*) is preferably a composite of a film web (F2) and of a coating (B2) which is applied thereon and at least partially embossed and at least partially cured.

During the implementation of step (2-*i*), the composite (F2B2) used as embossing die (p1) in step (2-*i*) is preferably guided via a first roll functioning as embossing tool (P1), and the composite (F1B1*a*) is guided via a second roll, which is opposite the first roll and is counter-rotating thereto or co-rotating therewith, preferably counter-rotating.

The at least partial embossing as per step (2-*i*) takes place preferably at the level of the roll nip formed by the two mutually opposing rolls, rotating counter-directionally or in the same direction, and the at least partially embossed coating (B2) of the composite (B2F2) is facing the coating composition (B1*a*) of the composite (F1B1*a*). The at least partial embossing here is accomplished preferably by pressing of the composite (F2B2) onto the composite (F1B1*a*).

The composite (F2B2) used preferably as embossing die (p1) in step (2-*i*) and composed of substrate (F2) and at least partially embossed and at least partially cured coating (B2) is also referred to below as "master substrate" or "master film element". Where the substrate (F2) is a film, the corresponding master film element is referred to as "master film". Where the substrate (F2) is a film web, the corresponding master film element is referred to as "master film web". The coating (B2) of the master film element is also referred to hereinafter as "at least partially cured master coating" or "master coating layer", and the coating composition (B2*a*) used for producing the cured master coating is referred to as "master coating". There is preferably no further (coating) layer between (F2) and (B2) in the composite (F1B1). It is, however, possible for there to be at least one adhesion promoter layer present between (F2) and (B3) of the composite (F2B2), said layer in this case being preferably permeable to UV radiation.

Optional Step (3)

Step (3) of the method of the invention provides for at least partial curing of the coating composition (B1*a*) within the composite (F1B1*a*) obtained after step (2-*i*) or step (2-*ii*); throughout the duration of the at least partial curing, the coating composition (B1*a*) is in contact with the embossing die (p1). After implementation of step (3), a composite (B1F1) is obtained, composed of substrate (F1) and at least partially embossed and at least partially cured coating (B1).

Steps (2-*i*) and (3) are preferably carried out concurrently. In that case the at least partial curing as per step (3) takes place preferably in situ during the implementation of step (2-*i*).

The corresponding apparatus used in implementing step (3) therefore preferably comprises at least one radiation source for irradiating the coating composition (B1*a*) with a curative radiation. Since the coating composition (B1*a*) is preferably a UV-radiation-curable coating composition, the curative radiation used is preferably UV radiation. If the coating composition (B1*a*) is not radiation-curable, it is preferably chemically curable. In that case the curing as per step (3) takes place thermally, by use of suitable thermal radiation sources, for example. Also possible, of course, is combined curing, i.e., thermal curing and curing by means of UV radiation.

Examples of suitable radiation sources for the radiation curing are low-pressure, medium-pressure and high-pressure mercury lamps, and also fluorescent tubes, pulsed lamps, metal halide lamps (halogen lamps), lasers, LEDs and also electronic flash units, with the result that radiation curing is possible without a photoinitiator, or else excimer lamps. Radiation curing takes place through exposure to high-energy radiation, i.e., UV radiation or daylight, or by bombardment with high-energy electrons. The radiation dose normally sufficient for crosslinking in the case of UV curing is in the range from 80 to 3000 mJ/cm$^2$. It will be appreciated that a number of radiation sources can also be used for the cure, for example two to four. These sources may also emit each in different wavelength ranges.

The at least partial curing in step (3) takes place preferably by irradiation through the substrate (F1). In that case it is advantageous for the permeability of the substrate (F1) to the radiation used to be tailored to at least one photoinitiator used, which is present preferably in the coating composition (B1*a*). Thus, for example, the material PET as substrate (F1), hence a PET film, for example, is permeable to radiation having a wavelength of below 400 nm. Photoinitiators which generate radicals in the case of such radiation include, for example, 2,4,6-trimethylbenzoyldiphenylphosphine oxide, ethyl 2,4,6-trimethylbenzoylphenylphosphinate and bis(2,4,6-trimethylbenzoyl)phenylphosphine oxide. In this case, therefore, there is preferably at least one such photoinitiator present in the coating composition (B1*a*).

Optional Step (4)

Step (4) of the method of the invention provides for optional removal of the composite (F1B1) from the embossing die (p1). Accordingly, it is possible to obtain a composite (F1B1) composed of substrate (F1) and of at least partially embossed and at least partially cured coating (B1). Preference is given to implementing step (4).

Alternative (ii) Comprising Steps (1-*ii*) and (2-*ii*)

The method of the invention according to alternative (ii) comprises at least the steps (1-*ii*), (2-*ii*) and optionally (3) and also optionally (4). Steps (3) and (4) have already been described above in connection with alternative (i) and may also be carried out analogously within alternative (ii).

All of the preferred embodiments described in connection with alternative (i) can be applied analogously to alternative (ii).

Step (1-*ii*)

Step (1-*ii*) of the method of the invention provides for application of a coating composition (B1*a*) to at least a part of a surface, at least partially embossed, of an embossing die (p1) of an embossing tool (P1). As mentioned above, the embossing die used in this case may be a composite (B2F2) composed of a substrate (F2) and of an at least partially embossed and at least partially cured coating (B2).

Step (2-*ii*)

Step (2-*ii*) of the method of the invention provides for application of a substrate (F1) to at least a part of the surface of the coating composition (B1*a*), applied to the embossing die (p1), to give a composite (B1*a*F1) located on (p1).

If a composite (B2F2) is used as embossing die (p1) in step (1-*ii*), then this composite, after the application of the coating composition (B1*a*) preferably to at least a part of its at least partially embossed surface, to give the composite (B1*a*B2F2), during the implementation of step (2-*ii*), is guided via a first roll, which acts as embossing tool (P1), and the substrate (F1) used within step (2-*ii*) is guided via a second roll, which is opposite the first roll and which rotates in the same direction or in the opposite direction, preferably the opposite direction, to said first roll. The at least partial embossing as per step (2-*ii*) takes place preferably at the level of the roll nip, which is formed by the two mutually opposite rolls, rotating in the same direction or in opposite directions, with the coating composition (B1a) of the composite (B1aB2F2) facing the substrate (F1). The at least partial embossing in this case is achieved preferably by applying pressure or pressing the substrate (F1) onto the composite (B1aB2F2).

FIG. 1 shows schematically a side view of an apparatus which can be used to implement steps (1-i) and (2-i) and also optionally (3) and optionally (4) of the method of the invention, and which is used for exemplary illustration of the method of the invention. This apparatus may also equally be employed, in a fundamentally analogous way, to implement steps (1-ii) and (2-ii) and also (3) and optionally (4) of the method of the invention. By means of this apparatus it is possible to transfer structures such as microstructures and/or nanostructures preferably from an embossing die (F2B2, p1), present as master film element, onto a substrate (F1) coated with (B1a). This apparatus is therefore also referred to generally as a transfer apparatus and is given the reference symbol (10) in FIG. 1.

The core of the transfer apparatus (10) is an embossing region (1), in which there is a press roll (2) arranged as a roll jacket made of fused silica. The press roll (2) is driven for rotation. Arranged alongside the press roll (2) is a radiation source in the form of lighting unit (3), which generates UV light and may in particular comprise a row of UV-LEDs arranged in the lengthwise direction of the press roll (2). As shown in FIG. 1, the lighting unit (3) may also be disposed in the interior of the press roll (2). Arranged in a manner pressed against the press roll (2) is a pressure application roll (4) in the embossing region (1). In a die frame (5) of the transfer apparatus (10) there are two film web rollers (6) and (7) arranged, which can be motor-driven for rotation. Of course, the film web rollers (6) and (7) may also be mounted and arranged otherwise than in a die frame (5), as for example in a cabinet element or else outside the actual transfer apparatus (10). Rolled onto the film web rollers (6) and (7), which here are shown as disposed in the die frame, is a master film web (8) which represents a continuous embossing die. The master film web (8) is provided on a transfer surface with a master coating layer, in which there are negative forms of microstructures and/or nanostructures to be transferred, as a surface relief. The master coating layer is at least partially cured, and so the relief-like structurings therein are stable. The master film web (8) constitutes a composite (F2B2). The master film web (8) runs off from the first film web roller (6), is supplied via various deflection roller systems to the embossing region (1), and runs—as is evident from FIG. 1—perpendicularly from above into the region between the press roll (2) and the pressure application roll (4). In that region it is guided in taut contact over a section of the periphery of the press roll (2), and then leaves the press roll (2) again and is supplied, once more via deflection roller systems with web tensioners, to the second film web roller (7), on which it is wound. A film web (9) forming the substrate (F1) to be provided with structures such as microstructures and/or nanostructures is supplied, starting from a film web roller (11), here also via various deflection roller systems with web tensioners, to the embossing region (1), where it runs tautly over a peripheral section of the pressure application roll (4) and from there into the region of the contact of the pressure application roll (4) on the press roll (2) or into the region of the roll nip formed between these elements. The film web (9) leaves this region, in the representation according to FIG. 1, perpendicularly downward and is guided—again guided via deflection roller systems and web tensioners—to a film web roller (12), on which it is wound up as a fully treated product. On its path into the embossing region (1) or on to the roll nip between the press roll (2) and the pressure application roll (4), the film web (9) is provided with a coating layer on its surface facing the press roll (2) in the press region (1), by means of a coating application unit (27) which in this case is disposed outside the press region (1). The coating application unit (27) therefore applies a coating composition (B1a) to the film web (9) used as (F1), as per step (1-i) of the method of the invention. In the press region (1), the film web (9) is then brought together, by its surface provided with the as yet uncured coating layer, with the surface—provided with the master coating layer—of the master film web (8), in order to implement step (2-i) of the method of the invention. Before the transfer of the structures, the master coating layer is wetted with at least one organic solvent and/or at least one reactive diluent by means of an ultrasonic nozzle. In this case the film web (9) runs via the pressure application roll (4) and the master film web (8) runs via the press roll (2). Both webs, the film web (9) and the master film web (8), are facing one another with the respective coating layer (in the case of the master film web (8), the at least partially cured master coating layer which corresponds to the coating (B2); in the case of the film web (9), the uncured coating layer which corresponds to the coating composition (B1a)). In the region in which the pressure application roll (4) is pressed against the press roll (2), the negative image of the structures to be transferred, such as microstructures and/or nanostructures, this negative image being formed in the master coating layer (B2), is pressed into the uncured coating layer, which corresponds to the coating composition (B1a), and in this way the structures are transferred. Concurrently, by the lighting unit (2), UV illumination and hence an at least partial curing of the uncured coating layer, which corresponds to the coating composition (B1a) of the coating layer on the film web (9), is carried out as long as this coating layer is still in contact with the master coating layer (8). Hence the at least partial curing of the coating layer is carried out directly during transfer of the structures and in situ. The irradiation of the film web (9), or of the uncured coating layer applied thereon, is accomplished here through the film material (9), on irradiation from outside onto the press cylinder (2). Alternatively, irradiation takes place through the fused silica material of the outer surface of the press cylinder (2) and also through the material of the master film web (8) and of the master coating layer applied thereon. Accordingly, the master film web (8) and master coating layer are designed so as to be permeable to the radiation used, in this case UV light. The outer surface of the press roll (2) is described here as consisting of fused silica. Any other material, however, is also suitable here in principle, provided that it is permeable to the curative radiation (which may be other than UV light) emitted from the interior of the press roll (2). Alternatively, instead of the lighting unit (3) which supplies UV illumination, it is also possible, for example, to use a thermal emitter if the coating composition (B1a) is a non-radiation-curing coating composition. A possibility following the at least partial curing by UV illumination is an optional post-exposure, by means of IR radiation, for example. At the end of this curing operation as per optional step (4) of the method of the invention, the film web (9) and the master film web (8) part from one another, with parting of the respectively now structured layer composites (F1B1) and master film element (F2B2). The coated film web (9) thus provided with the desired structuring (i.e. the composite (F1B1)) is supplied as a complete product to the film web roller (12), on which it is wound. If there is illumination from outside by means of a lighting unit (3) onto the press roll (2), then the coated film web (9) provided with the desired structuring (i.e., the composite (F1B1)) may also be opaque, if the arrangement is selected such that the master film web (8) (i.e., the composite (F2B2)) and the film web (9) (i.e., the composite (F1B1)) are switched. The coating on the coating application unit (27) in accordance with step (1-i) of the method of the invention can then take place without restriction of the operation onto the master film web (8).

FIG. 2 shows schematically a side view of an apparatus which can be used for implementing steps (1-i) and (2-i) and also optionally (3) and optionally (4) of the method of the invention, and which is used for exemplary illustration of the method of the invention. By means of this apparatus it is possible in particular to transfer structures such as microstructures and/or nanostructures, by means of a conventional embossing tool (P1), to a substrate (F1) coated with (B1a), and, after at least partial curing, to obtain a composite (F1B1).

The apparatus (30) shown in FIG. 2 operates according to a transfer principle wherein the desired negative structures are embossed directly, from a structured pressed cylinder or a press roll, which in this case is a master press cylinder (17), into the as yet uncured coating layer applied to the master film web (8b), corresponding to a composite (F1B1a), and this coating layer is then at least partially cured, with the structures applied thereon, with curing taking place in situ by means of a lighting unit (3), to give the master film web (8)—corresponding to a composite (F1B1). In this method, the film web (8a) used as substrate (F1) is drawn off from a film web roller (18), which contains only the carrier material, in other words the pure film without applied master coating, and is guided via various deflection roller systems and web tensioning systems, and is introduced into an embossing region (1) of the apparatus. There, the film web (8a) runs into a region between a pressure application roll (4) and the master press cylinder (17), and is provided outside the press region, in the coating application device (27), with the as yet uncured master coating layer (corresponding to the coating composition B1a). In the embossing region (1), in which the master film web (8b) with the as yet uncured master coating layer runs along a section of the outer surface of the master press cylinder (17), the microstructures and/or nanostructures embossed into the outer surface of the master press cylinder (17) are introduced as a negative image into the master coating layer of the master film web (8b) and are transferred. Before transfer of the structures, the microstructures and/or nanostructures embossed into the outer surface of the press cylinder (17) are wetted with at least one organic solvent and/or at least one reactive diluent, by means of an ultrasonic nozzle. The master film web (8b) bearing the uncured coating composition (B1a) is then at least partially cured in accordance with optional step (3) of the method of the invention.

Curing here takes place in situ by irradiation with a lighting unit (3), by means of UV radiation, as for example by means of a unit formed of UV-LEDs. The resulting master film (8), in other words the composite (F1B1), is subsequently taken off from the outer surface of the master press cylinder (17), and the master film web (8) thus completed is spooled up onto a film web roller (19). The film web roller (19) then contains the completed master film web (8) with the master coating layer applied thereon and with the negative images of the microstructures and/or nanostructures embossed therein. This film web roller (19) can be removed and then used as first film web roller (6) in a transfer apparatus (10) according to FIG. 1 or in another transfer apparatus operating with the same principle.

Coating Composition (B1a)

Any kind of coating composition may be used as coating composition (B1a) within the method of the invention. The coating composition (B1a) may be a physically drying, thermally curable, chemically curable, and/or radiation-curable coating composition (B1a). With preference the coating composition (B1a) is a chemically curable, a thermally curable and/or radiation-curable coating composition, more preferably a radiation-curable coating composition. Accordingly, the at least partial curing as per optional step (3) takes place preferably by means of radiation curing.

Physical drying here preferably refers to the simple evaporation of solvent(s) to form the coating (B1). Thermal curing here preferably entails a curing mechanism which is attributable to a temperature above room temperature (>23° C.). This may be, for example, the formation of radicals or ions, preferably radicals from an initiator which breaks down at the elevated temperatures and so initiates a radical or ionic polymerization. Examples of such thermally activatable initiators are those which have a half-life at 80° C. of less than 100 hours. Chemical curing refers preferably to the reaction of at least two different and mutually complementary reactive functional groups, in the manner, for example, of a polycondensation such as a reaction of an OH group with a COOH group, or of a polyaddition (reaction of an NCO group with an OH or amino group).

If the coating composition (B1a) is a physically drying, thermally curable and/or chemically curable coating composition, it is prepared using, as binder, at least one customary polymer known to the skilled person. This binder then preferably has crosslinkable functional groups. Any customary crosslinkable functional group known to the skilled person is suitable in this context. More particularly, the crosslinkable functional groups are selected from the group consisting of hydroxyl groups, amino groups, carboxylic acid groups, isocyanates, polyisocyanates and epoxides. The polymers are preferably curable or crosslinkable exothermically or endothermically, preferably in a temperature range from −20° C. up to 250° C., or from 18° C. to 200° C. Especially suitable as polymers are at least one polymer selected from the group consisting of polyurethanes, polyethers, polyesters, polyamides, polyureas, polyvinyl chlorides, polystyrenes, polycarbonates, poly(meth)acrylates, epoxy resins, phenol-formaldehyde resins, melamine-formaldehyde resins. The polymers here may in particular be OH-functional. In that case they may be subsumed by the general term "polyols". Such polyols may for example be polyacrylate polyols, polyester polyols, polyether polyols, polyurethane polyols, polyurea polyols, polyester-polyacrylate polyols, polyester-polyurethane polyols, polyurethane-polyacrylate polyols, polyurethane-modified alkyd resins, fatty acid-modified polyester-polyurethane polyols, and also mixtures of the stated polyols. Preference is given to polyacrylate polyols, polyester polyols and polyether polyols.

It is possible in this context to use at least one polymer which is cured with participation of isocyanate and/or oligomerized isocyanate groups, very preferably at least one corresponding polyurethane and/or at least one corresponding polyurea (e.g., what are called "polyaspartic binders"). Polyaspartic binders are components which are converted from reaction of amino-functional compounds, especially secondary amines, with isocyanates. If at least one polyurethane is used, then those suitable especially are polyurethane-based resins which are preparable by a polyaddition reaction between hydroxyl-containing components such as polyols and at least one polyisocyanate (aromatic and aliphatic isocyanates, di-, tri- and/or polyisocyanates). Normally this needs a stoichiometric conversion of the OH groups of the polyols with the NCO groups of the polyisocyanates. However, the stoichiometric ratio to be used may also be varied, since the polyisocyanate can be added to the polyol component in amounts such that there may be an "overcrosslinking" or an "undercrosslinking". If epoxy resins, i.e., epoxide-based resins, are used, then those suitable are preferably epoxide-based resins which are prepared from glycidyl ethers which have terminal epoxide groups and, within the molecule, hydroxyl groups as functional groups. These are preferably reaction products of bisphenol A and epichlorohydrin or bisphenol F with epichlorohydrin, and mixtures thereof, which are also used in the presence of reactive diluents. The curing or crosslinking of such epoxide-based resins is accomplished customarily by a polymerization of the epoxide groups of the epoxide ring, by a polyaddition reaction in the form of an addition reaction of other reactive compounds, as hardeners, in stoichiometric amounts with the epoxide groups, in which case, accordingly, the presence of one active hydrogen equivalent per epoxide group is required (i.e., one H-active equivalent is needed for curing per epoxide equivalent), or by polycondensation via the epoxide groups and the hydroxyl groups. Examples of suitable hardeners are polyamines, especially (hetero)aliphatic, (hetero)aromatic and (hetero)cycloaliphatic polyamines, polyamidoamines, polyaminoamides, and also polycarboxylic acids and their anhydrides.

The coating composition (B1a) may be cured through the use of a radiation source, preferably by use of UV radiation. Consequently (B1a) is preferably a UV radiation-curing coating composition.

(B1a) therefore preferably contains unsaturated carbon double bonds, more preferably (meth)acrylic groups. This coating composition (B1a) preferably contains at least one urethane (meth)acrylate. In the case of curing using (N)IR and/or UV light, the coating composition (B1a) preferably comprises at least one photoinitiator which is able to be broken down into radicals by light of the irradiated wavelength, these radicals then being able to initiate a radical polymerization. In the case of curing with electronic radiation, in contrast, the presence of such photoinitiators is not necessary.

The coating composition (B1a) is preferably a radiation-curable coating composition. The terms "radiation-curable" and "radiation-curing" are interchangeable here. The term "radiation curing" refers preferably to radical polymerization of polymerizable compounds by virtue of electromagnetic and/or participate radiation, examples being (N)IR light in the wavelength range of $\lambda=>400$-1200 nm, preferably 700-900 nm, and/or UV light in the wavelength range of $\lambda=100$ to 400 nm, preferably of $\lambda=200$ to 400 nm and more preferably $\lambda=250$ to 400 nm, and/or electronic radiation in the range from 150 to 300 keV, and more preferably with a radiation dose of at least 80, preferably 80 to 3000, mJ/cm$^2$. Curing takes place with particular preference using UV radiation, as radiation curing. The coating composition (B1a) may be cured using a suitable radiation source. Consequently (B1a) is preferably a UV radiation-curing coating composition.

For curing using (N)IR and/or UV light, the coating composition (B1a) comprises at least one photoinitiator as component (a). This photoinitator can be broken down into radicals by light of the irradiated wavelength, these radicals being able in turn to initiate a radical polymerization. In the case of curing with electronic radiation, in contrast, there is no need for the presence of such photoinitiators. The coating composition (B1a) preferably comprises at least one photoinitiator as component (a), which by light of the irradiated wavelength can be broken down into radicals, which are able in turn to initiate a radical polymerization.

Photoinitiators such as UV photoinitiators are known to the skilled person. Examples of those contemplated include phosphine oxides, benzophenones, α-hydroxyalkyl aryl ketones, thioxanthones, anthraquinones, acetophenones, benzoins and benzoin ethers, ketals, imidazoles or phenylglyoxylic acids and mixtures thereof.

Phosphine oxides are, for example, monoacyl- or bisacylphosphine oxides, as for example 2,4,6-trimethylbenzoyldiphenyl-phosphine oxide, ethyl-2,4,6-trimethylbenzoylphenylphosphinate or bis(2,6-dimethoxybenzoyl)-2,4,4-trimethylpentylphosphine oxide. Benzophenones are, for example, benzophenone, 4-aminobenzophenone, 4,4'-bis(dimethylamino)benzophenone, 4-phenylbenzophenone, 4-chlorobenzophenone, Michler's ketone, o-methoxybenzophenone, 2,4,6-trimethylbenzophenone, 4-methylbenzophenone, 2,4-dimethylbenzophenone, 4-isopropylbenzophenone, 2-chlorobenzophenone, 2,2'-dichlorobenzophenone, 4-methoxybenzophenone, 4-propoxybenzophenone or 4-butoxybenzophenone. α-hydroxy-alkyl aryl ketones are, for example, 1-benzoylcyclohexan-1-ole (1-hydroxycyclohexyl phenyl ketone), 2-hydroxy-2,2-dimethylacetophenone, (2-hydroxy-2-methyl-1-phenyl-propan-1-one), 1-hydroxyacetophenone, 1-[4-(2-hydroxyethoxy)phenyl]-2-hydroxy-2-methyl-1-propan-1-one or polymer comprising 2 hydroxy-2-methyl-1-(4-isopropen-2-ylphenyl)propan-1-one in copolymerized form. Xanthones and thioxanthones are, for example, 10-thio xanthenone, thioxanthen-9-one, xanthen-9-one, 2,4-dimethylthioxanthone, 2,4-diethylthioxanthone, 2,4-diisopropylthioxanthone, 2,4-dichlorothioxanthone or chloroxanthenone; anthraquinones are, for example, 8-methylanthraquinone, tert-butylanthraquinone, anthraquinonecarboxylic esters, benz[de]anthracen-7-one, benz[a]anthracen-7,12-dione, 2 methylanthraquinone, 2-ethylanthraquinone, 2-tert-butylanthraquinone, 1-chloroanthraquinone or 2-amylanthraquinone. Acetophenones are, for example, acetophenone, acetonaphthoquinone, valerophenone, hexanophenone, aphenylbutyrophenone, p-morpholinopropiophenone, dibenzosuberone, 4-morpholinobenzophenone, p-diacetylbenzene, 4'-methoxyacetophenone, α-tetralone, 9-acetylphenanthrene, 2-acetylphenanthrene, 3-acetylphenanthrene, 3-acetylindole, 9-fluorenone, 1-indanone, 1,3,4-triacetylbenzene, 1-acetonaphthone, 2-acetonaphthone, 2,2-dimethoxy-2-phenylacetophenone, 2,2-diethoxy-2-phenylacetophenone, 1,1-dichloroacetophenone, 1-hydroxyacetophenone, 2,2-diethoxyacetophenone, 2-methyl-1-[4-(methylthio)phenyl]2-morpholinopropan-1-one, 2,2-dimethoxy-1,2-diphenylethan-2-one or 2-benzyl-2-dimethylamino-1-(4-morpholinophenyl)butan-1-one.

Benzoins and benzoin ethers are, for example, 4-morpholino-deoxybenzoin, benzoin, benzoin isobutyl ether, benzoin tetrahydropyranyl ether, benzoin methyl ether, benzoin ethyl ether, benzoin butyl ether, benzoin isopropyl ether or 7H-benzoin methyl ether. Ketals are, for example, acetophenone dimethyl ketal, 2,2-diethoxyacetophenone, or benzil ketals, such as benzil dimethyl ketal. Examples of photoinitiators which can also be used are benzaldehyde, methyl ethyl ketone, 1-naphthaldehyde, triphenylphosphine, tri-o-tolylphosphine, or 2,3-butanedione. Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone, or 2,4,6-trimethylbenzophenone and 4-methylbenzophenone and 2,4,6-trimethylbenzoyldiphenylphosphine oxide.

Preference among these photoinitiators is given to 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, 1-benzoylcyclohexan-1-ol, 2-hydroxy-2,2-dimethylacetophenone, and 2,2-dimethoxy-2-phenylacetophenone. Preferably, therefore, at least one such photoinitiator is used as component (a). Examples of commercially available photoinitiators are the products Irgacure® 184, Irgacure® 500, Irgacure® TPO, Irgacure® TPO-L and Lucirin® TPO and also Darocure® 1173 from BASF SE.

Coating composition (B1a) preferably comprises at least one component (b) which contains at least one, preferably terminal, carbon double bond. Preferably this is a (meth) acrylic group. Component (b) preferably contains one or two ethylenically unsaturated groups such as, for example, one or two or three or else more (meth)acrylic groups. Two or more different components (b) may also be used.

Examples of component (b) are mono-, di- and/or trifunctional (meth)acrylic esters such as ethylene glycol di(meth)acrylate, 1,2-propanediol di(meth)acrylate, 1,3-propanediol di(meth)acrylate, 1,4-butanediol di(meth)acrylate, 1,3-butanediol di(meth)acrylate, 1,5-pentanediol di(meth)acrylate, 1,6-hexanediol di(meth)acrylate, 1,8-octanediol di(meth)acrylate, neopentyl glycol di((meth)acrylate, 1,1-, 1,2-, 1,3- and 1,4-cyclohexanedimethanol di(meth)acrylate, 1,2-, 1,3- or 1,4-cyclohexanediol di(meth)acrylate, tricyclodecanedimethanol di(meth)acrylate, tri-methylolpropane tri (meth)acrylate, ditrimethylolpropane penta- or hexa(meth) acrylate, pentaerythritol tri- or tetra(meth)acrylate, glycerol di- or tri(meth)acrylate, and also di- and poly(meth)acrylates of sugar alcohols, as for example of sorbitol, mannitol, diglycerol, threitol, erythritol, adonitol (ribitol), arabitol (lyxitol), xylitol, dulcitol (galactitol), maltitol or isomalt, 2-phenoxyethyl (meth)acrylate, ethyl diglycol (meth)acrylate, 4-tert-butylcyclo-hexyl (meth)acrylate, trimethylolpropane formal mono(meth)acrylate, isobornyl (meth)acrylate, tetrahydrofurfuryl (meth)acrylate, 2-(2-ethoxyethoxy)ethyl (meth)acrylate, and also lauryl, stearyl, isodecyl, octyl and decyl (meth)acrylate, esters of $\alpha,\beta$-ethylenically unsaturated carboxylic acids, preferably of (meth)acrylic acid, with alcohols containing 1 to 20 carbon atoms, preferably optionally hydroxy-substituted alkanols containing 1 to 20 carbon atoms, e.g., methyl (meth)acrylate, ethyl (meth)acrylate, n-butyl (meth)acrylate, 2-ethylhexyl (meth)acrylate, 2-hydroxyethyl (meth)acrylate, 2-hydroxypropyl (meth)acrylate or 4-hydroxybutyl (meth) acrylate.

Especially preferred components (b) are 1,4-butanediol di(meth)acrylate and 1,6-hexanediol di(meth)acrylate and also tricyclodecanedimethanol di(meth)acrylate.

As component (b) it is possible, moreover, additionally or alternatively to employ at least one polyester, polyether, carbonate, epoxide, poly(meth)acrylate and/or urethane (meth)acrylate, and/or unsaturated polyester resin.

Urethane (meth)acrylates are obtainable for example by reacting polyisocyanates with hydroxyalkyl (meth)acrylates and optionally chain extenders such as diols, polyols, diamines, polyamines, or dithiols or polythiols. Urethane (meth)acrylates which can be dispersed in water without addition of emulsifiers additionally comprise ionic and/or nonionic hydrophilic groups, which are introduced into the urethane by means of constituent components such as hydroxycarboxylic acids, for example. Urethane (meth) acrylates of this kind comprise as constituent components substantially:

(a) at least one organic aliphatic, aromatic or cycloaliphatic di- or polyisocyanate, as for example at least one of the polyisocyanates described above for the two-component coating materials, (b) at least one compound having at least one isocyanate-reactive group, preferably one of the hydroxyl-bearing monomers described above for the polyacrylate polyols, and having at least one radically polymerizable unsaturated group, and (c) optionally at least one compound having at least two isocyanate-reactive groups, as for example one of the polyhydric alcohols described above for the polyesterols.

The urethane (meth)acrylates preferably have a number-average molar weight $M_n$ of 200 to 20 000, in particular of 500 to 10 000 and more preferably 600 to 3000 g/mol (determined by gel permeation chromatography using tetrahydrofuran and polystyrene as standard). The urethane (meth)acrylates preferably have a (meth)acrylic group content of 1 to 5, more preferably of 2 to 4, mol per 1,000 g of urethane (meth)acrylate. Examples of commercially available urethane (meth)acrylates which can be employed as component (b) are products of the Laromer® or Desmolux® series such as Laromer® UA 9033, Laromer® UA 9065 or Desmolux® XP 2738.

Epoxy (meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers. Examples of possible epoxidized olefins include ethylene oxide, propylene oxide, isobutylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene, tris[4-(2,3-epoxypropoxy)phenyl] methane isomers, phenol-based epoxy novolaks, and cresol-based epoxy novolaks Examples of aliphatic glycidyl ethers are 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane, diglycidyl ether of polypropylene glycol ($\alpha,\omega$-bis(2,3-epoxypropoxy)poly-(oxypropylene) and of hydrogenated bisphenol A (2,2-bis[4-(2,3-epoxypropoxy)cyclohexyl]propane). The epoxy (meth)acrylates preferably have a number-average molar mass $M_n$ of 200 to 20 000, more preferably of 200 to 10 000 g/mol, and very preferably of 250 to 3000 g/mol; the amount of (meth) acrylic groups is preferably 1 to 5, more preferably 2 to 4, per 1000 g of epoxy (meth)acrylate (determined by gel permeation chromatography using polystyrene as standard and tetrahydrofuran as eluent).

(Meth)acrylated poly(meth)acrylates are the corresponding esters of $\alpha,\beta$-ethylenically unsaturated carboxylic acids, preferably of (meth)acrylic acid, more preferably of acrylic acid, with polyacrylate polyols, obtainable by esterification of poly(meth)acrylate polyols with (meth)acrylic acid. The polyacrylate polyols may for example be those as described above for the two-component coating materials.

Carbonate (meth)acrylates are available with various functionalities. The number-average molecular weight M, of the carbonate (meth)acrylates is preferably less than 3000 g/mol, more preferably less than 1500 g/mol, more preferably less than 800 g/mol (determined by gel permeation chromatography with polystyrene as standard; solvent: tetrahydrofuran). The carbonate (meth)acrylates are readily available through transesterification of carbonic esters with polyhydric, preferably dihydric, alcohols (diols, e.g., hexanediol), and subsequent esterification of the free OH groups with (meth)acrylic acid or else transesterification with (meth)acrylic esters, as is described in EP 0 092 269 A1, for example. They are also obtainable by reacting phosgene, urea derivatives with polyhydric, e.g., dihydric, alcohols. Also conceivable are (meth)acrylates of polycarbonate polyols, such as the reaction product of one of the stated diols or polyols and a carbonic ester and also a hydroxyl-containing (meth)acrylate. Examples of suitable carbonic esters include ethylene carbonate, 1,2- or 1,3-propylene carbonate, dimethyl carbonate, diethyl carbonate or dibutyl carbonate. Examples of suitable hydroxyl-containing (meth)acrylates are 2-hydroxyethyl (meth)acrylate, 2- or 3-hydroxypropyl (meth)acrylate, 1,4-butanediol mono (meth)acrylate, neopentyl glycol mono(meth)acrylate, glycerol mono- and di(meth)acrylate, trimethylolpropane mono- and di(meth)acrylate, and pentaerythritol mono-, di- and tri(meth)acrylate. The carbonate (meth)acrylates are preferably aliphatic carbonate (meth)acrylates.

Unsaturated polyester resins are preferably synthesized from the following components:
(a1) maleic acid or derivatives thereof,
(a2) at least one cyclic dicarboxylic acid or derivatives thereof,
(a3) at least one aliphatic or cycloaliphatic diol.
Derivatives here refer preferably to
the corresponding anhydrides in monomeric or else polymeric form,
monoalkyl or dialkyl esters, preferably mono- or di-$C_1$-$C_4$ alkyl esters, more preferably monomethyl or dimethyl esters or the corresponding monoethyl or diethyl esters, or else mono- and divinyl esters, and also
mixed esters, preferably mixed esters with different $C_1$-$C_4$-alkyl components, more preferably mixed methyl ethyl esters.

If (B1a) includes a component (b), that component is preferably at least one urethane (meth)acrylate.

The coating component (B1a) may further comprise an additive, as component (c). The term "additive" is known to the skilled person, from, for example, Römpp Lexikon, "Lacke und Druckfarben", Thieme Verlag, 1998, page 13. Preferred for use as component (c) is at least one rheological additive. This term as well is known to the skilled person, from, for example, Römpp Lexikon, "Lacke und Druckfarben", Thieme Verlag, 1998, page 497. The terms "rheological additive" and "rheology assistant" are interchangeable. The additive employed as component (c) is preferably selected from the group consisting of flow control agents, surface-active agents such as surfactants, wetting agents and dispersants, and also thickeners, thixotropic agents, plasticizers, and lubricity and antiblocking additives, and also mixtures thereof. These terms are likewise known to the skilled person, from, for example, Römpp Lexikon, "Lacke und Druckfarben", Thieme Verlag, 1998. Flow control agents are components which help coating compositions to flow out into even films by lowering the viscosity and/or surface tensions. Wetting agents and dispersants are components which lower the surface tension or, generally, the interfacial tension. Lubricity and antiblocking additives are components which reduce sticking (blocking). Examples of commercially available additives are the products Efka® SL 3259, Byk® 377, Tego® Rad 2500, Tego® Rad 2800, Byk® 394, Byk-SILCLEAN 3710, Silixan® A250, Novec FC 4430 and Novec FC 4432. Preferred for use as additive (c) is at least one poly(meth)acrylate and/or at least one siloxane such as at least one oligosiloxane and/or polysiloxane, and/or at least one fluorine-containing polymer such as a fluorine-containing, preferably aliphatic polyester. Particularly preferred are siloxanes as component (c). Especially preferred is the use of silicone (meth)acrylates.

The coating composition (B1a) may comprise at least one further component (d), different from the components (a) and (b) and (c), such as, for example, fillers, pigments, thermally activatable initiators such as, for example, potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzopinacol, di-tert-butyl peroxide, cumene hydroperoxide, dicumyl peroxide, tert-butyl perbenzoate, silylated pinacols, hydroxyl-containing amine N-oxides, such as 2,2,6,6-tetramethylpiperidine-N-oxyl and 4-hydroxy-2,2,6,6-tetramethylpiperidine-N-oxyl, and organic solvents, and also stabilizers.

Preferably, however, there are no organic solvents in (B1a). Component (c) may be present in an amount in a range from 0 to 15 wt %, preferably in a range from 0 to 12 wt %, more preferably in a range from 0 to 10 wt %, in (B1a), based in each case on the total weight of the coating composition (B1a).

The coating composition (B1a) comprises preferably
at least one photoinitiator as component (a) in an amount in a range from 0.01 to 15 wt %, preferably in a range from 0.1 to 12 wt %, more preferably in a range from 0.5 to 10 wt %,
the at least one component (b) in an amount in a range from 40 to 99 wt %, preferably in a range from 45 or >45 to 90 wt %, more preferably in a range from 50 or >50 such as 55 to 85 wt %, very preferably in a range from 55 or 60 to 80 wt %,
the at least one additive as component (c) in an amount in a range from 0.01 to 5 wt %, preferably in a range from 0.05 to 4.5 wt %, more preferably in a range from 0.1 to 4 wt %, very preferably in a range from 0.2 or 0.5 to 3 wt %,
based in each case on the total weight of the coating composition (B1a).

The solids content of the coating composition (B1a) is preferably ≥80 wt %, more preferably ≥90 wt %, very preferably ≥95 wt %, more particularly ≥98 or ≥99 wt %, most preferably 100 wt %, based in each case on the total weight of the coating composition (B1a). The solids content here is ascertained by means of the method described hereinafter.

The double bond conversion of the at least partially cured coating (B1) obtained from (B1a) is preferably at least 70%, more preferably at least 75%, more preferably still at least 80%, very preferably at least 85%, more particularly at least 90%.

Pretreatment

The method of the invention comprises a pretreatment—before the implementation of step (2-i) and before the implementation of step (1-ii)—of the at least one embossing die (p1) of the embossing tool (P1) with at least one organic solvent and/or at least one reactive diluent. This pretreatment preferably comprises wetting (spraying) of the at least one embossing die (p1) with at least one organic solvent and/or at least one reactive diluent. The wetting is accomplished preferably by means of at least one nozzle, more preferably by means of at least one ultrasonic nozzle. The wetting takes place preferably through formation of a mist, more preferably in the form of droplets, which condenses on the embossing die (p1) of the embossing tool (P1) and thereby covers it with a film of liquid. The embossing die (p1) of the embossing tool (P1) is preferably wetted completely, i.e., the entire embossing die, including all structural elevations, especially in the complete extents of the structure width and structure depth, is wetted.

The concept of "organic solvent" is known to the skilled person, for example, from Council Directive 1999/13/EC of Mar. 11, 1999 (referred to therein as solvent). In principle it is possible to use any customary organic solvent known to the skilled person in the pretreatment step carried out in the invention. The concept of "reactive diluent" is likewise known to the skilled person, for example, from Römpp, Lacke und Druckfarben, Thieme Verlag, 1998, page 491. Accordingly, the term "reactive diluent" refers to a dilution agent which in the course of film formation becomes part of the binder used. The term "binder" refers in the sense of the present invention, in agreement with DIN EN ISO 4618 (German version, date: March 2007), preferably to the nonvolatile fractions of a coating composition that are responsible for film formation. Pigments and/or fillers included therein are not subsumed under the concept of the binder. In principle, any customary reactive diluent known to the skilled person may be used in the pretreatment step carried out in the invention.

The at least one organic solvent is preferably selected from the group consisting of monohydric and polyhydric alcohols such as corresponding $C_1$-$C_{12}$ alcohols, examples being methanol, ethanol, 1-propanol, 2-propanol, 1-butanol, ethylene glycol, ethyl glycol, propyl glycol, butyl glycol, butyl diglycol, 1,2-propanediol and/or 1,3-propanediol, ethers, as for example diethylene glycol dimethyl ether, aliphatic hydrocarbons, aromatic hydrocarbons, as for example toluene and/or xylenes, ketones, as for example acetone, N-methylpyrrolidone, N-ethylpyrrolidone, methyl isobutyl ketone, isophorone, cyclohexanone and/or methyl ethyl ketone, esters, as for example methoxypropyl acetate, ethyl acetate and/or butyl acetate, amides, as for example dimethylformamide, and mixtures thereof. Particularly preferred are monohydric and polyhydric alcohols such as corresponding $C_1$-$C_6$ alcohols; especially preferred are corresponding $C_1$-$C_4$ alcohols such as ethanol.

The at least one reactive diluent is preferably selected from the group consisting of monofunctional (meth)acrylates, difunctional (meth)acrylates, trifunctional (meth)acrylates, and polyfunctional such as, for example, tetrafunctional and pentafunctional (meth) acrylates, and mixtures thereof.

Suitable monofunctional (meth)acrylates are, for example, 2-phenoxyethyl (meth)acrylate or more highly ethoxylated phenoxy (meth)acrylates, ethyl diglycol (meth) acrylate, ethyl triglycol (meth)acrylate, 4-tert-butylcyclohexyl (meth)acrylate, trimethylolpropane formal mono meth)acrylate, isobornyl (meth)acrylate, tetrahydrofurfuryl (meth)acrylate, 2-(2-ethoxyethoxy)ethyl (meth)acrylate, and also butyl, hexyl, lauryl, stearyl, isodecyl, octyl and decyl (meth)acrylate and 2-ethylhexyl (meth)acrylate.

Suitable difunctional (meth)acrylates are, for example, ethylene glycol di(meth)acrylate, 1,2-propanediol di(meth) acrylate, 1,3-propanediol di(meth)acrylate, 1,4-butanediol di(meth)acrylate, 1,3-butanediol di(meth)acrylate, 1,5-pentanediol di(meth)acrylate, 1,6-hexanediol di(meth)acrylate, 1,8-octanediol di(meth)acrylate, neopentyl glycol di(meth) acrylate, 1,1-, 1,2-, 1,3- and 1,4-cyclohexanedimethanol di(meth)acrylate, 1,2-, 1,3- or 1,4-cyclohexanediol di(meth) acrylate, glycerol di(meth)acrylate, di(meth)acrylates of sugar alcohols, such as for example sorbitol, mannitol, diglycerol, threitol, erythritol, adonitol (ribitol), arabitol (lyxitol), xylitol, dulcitol (galactitol), maltitol or isomalt.

Suitable trifunctional (meth)acrylates are, for example, trimethylolpropane tri(meth)acrylate, pentaerythritol tri (meth)acrylate, glycerol triacrylate, and also tri(meth)acrylates of sugar alcohols, as for example sorbitol, mannitol, diglycerol, threitol, erythritol, adonitol (ribitol), arabitol (lyxitol), xylitol, dulcitol (galactitol), maltitol or isomalt.

Suitable polyfunctional (meth)acrylates are, for example, ditrimethylolpropane penta- or hexa(meth)acrylate, pentaerythritol tetra(meth)acrylates, and poly(meth)acrylates of sugar alcohols, as for example sorbitol, mannitol, diglycerol, threitol, erythritol, adonitol (ribitol), arabitol (lyxitol), xylitol, dulcitol (galactitol), maltitol or isomalt.

Use

A further subject of the present invention is a use of an embossing tool (P1) comprising at least one embossing die (p1) for transferring an embossed structure to at least a part of a surface of a coating composition (B1a), wherein the at least one embossing die (p1) of the embossing tool (P1) has been pretreated, before the transfer, with at least one organic solvent and/or at least one reactive diluent, and the embossed structure transferred onto the coating composition (B1a) preferably comprises microstructures having a structure depth >30 µm.

All the preferred embodiments described hereinabove in connection with the method of the invention are also preferred embodiments with regard to the use of the invention.

Methods of Determination

1. Determining the Nonvolatile Fraction

The nonvolatile fraction (of the solids content) is determined in accordance with DIN EN ISO 3251 (date: June 2008). This determination is accomplished by weighing out 1 g of sample into an aluminum dish dried beforehand and carrying out drying in a drying oven at 125° C. for 60 minutes, followed by cooling in a desiccator, and then by reweighing. The residue, relative to the total amount of the sample employed, corresponds to the nonvolatile fraction.

2. Determining the Impression Accuracy

The impression accuracy is determined by means of a commercial atomic force microscope (AFM) and using a commercial cantilever. By means of AFM it is possible accordingly to compare, for example, the surface topography of a defined lattice structure such as that of the embossing tool P1, having a depth of 140 nm, for example, and a period of 430 nm, for example, with the surface topography of a master film (B1F1) after embossing. In this case the embossing tool is deliberately damaged at a particular site in order to define a reference point. By means of this reference point it is possible to investigate and compare with one another the same regions of the reference and of the replication. The impression accuracy defines how accurately a particular reference structure can be transferred, such as from the embossing tool P1 to a master film (B1F1), for example. If, for example, the investigated region of the embossing tool P1 features a lattice structure having a depth of 140 nm, then this reference depth is compared with the corresponding height of the structure determined on the master film (B1F1). The percentage change, corresponding here to the impression accuracy, is defined as $$\Delta h = 100 * \left(1 - \frac{h_m}{h_r}\right)$$

Δh corresponds here to the percentage change, $h_m$ to the height of the structure in the investigated region of the master film, and $h_r$ to the corresponding depth of the structure of the investigated region of the embossing tool. This percentage change, in other words the impression accuracy, is also referred to as 'contraction'. The smaller the values of Δh, the better the impression accuracy.

Inventive and Comparative Examples

The inventive and comparative examples below serve to illustrate the invention, but should not be interpreted as imposing any restriction.

Unless indicated otherwise, the amounts in parts are parts by weight, and the amounts in percent are percentages by weight, in each case.

1. Base Compounds and Materials Used

Laromer® UA 9033—aliphatic urethane acrylate from BASF AG

Irgacure® 500—commercially available photoinitiator from BASF AG

Byk-057—commercially available defoamer from BYK Chemie GmbH

2. Examples

Inventive Example 1: Production of a Structured Film (with Microstructure)

A continuous die with the desired positive structure is produced using a roll-to-roll embossing machine with a nickel embossing apparatus which carries the desired negative structure. For this purpose a transparent PET film web is used as substrate. This film web is first unwound from a roll and passed via a system of deflection rolls and a web cleaner to a coating application unit, in which the coating material is applied by slot-die coating. This enables precise control of the amount of coating material applied. Through temperature control of the slot coater it is possible to alter the flow quantity per unit time, so as to exert additional influence over the image of the applied coating. The coating material used is a mixture of 93.7 parts by weight of Laromer® UA 9033, 0.7 part by weight of Byk-057 and 5.6 parts by weight of Irgacure® 500. The surface of the film web that is to be provided with the desired embossed structure is stretched tautly and with an applied pressure is guided over a subsection of the outer surface of the press roll, which in another subsection is provided with the aforesaid coating material. As the press roll rotates and the film web is guided over it, the coating material is applied to the surface of the film web, where it adheres. In the same step, images of the negative structures of the press roll are then also embossed as a positive structure into the coating layer. The press roll used as embossing tool was wetted with ethanol before being used. Wetting takes place via an ultrasonic nozzle. The misting leads to formation of very fine droplets. The mist of solvent, guided in the direction of the embossing roll, condenses on the surface of the structured embossing roll. Because the droplets are much smaller by comparison with the structures, they are able to penetrate the "holes" in the structures and to provide the material of the embossing tool with a complete covering of a film of liquid. While the embossing apparatus is still in contact with the coating material, the coating material is cured by means of a UV-LED lamp (wavelength 365 nm, intensity 80%) from the direction of the uncoated side of the film. The typical power of the UV unit used is around 1300 mW/cm². At the end of the embossing operation, the film, with the coating applied to the surface, exhibiting the microstructures, and cured, is removed from the surface of the press roll, with the structures parting from the negative forms. In this way a continuous web is obtained of a film provided with a structured surface, and this film is then wound up.

3. Investigations on the Structured Film

Figure 3:
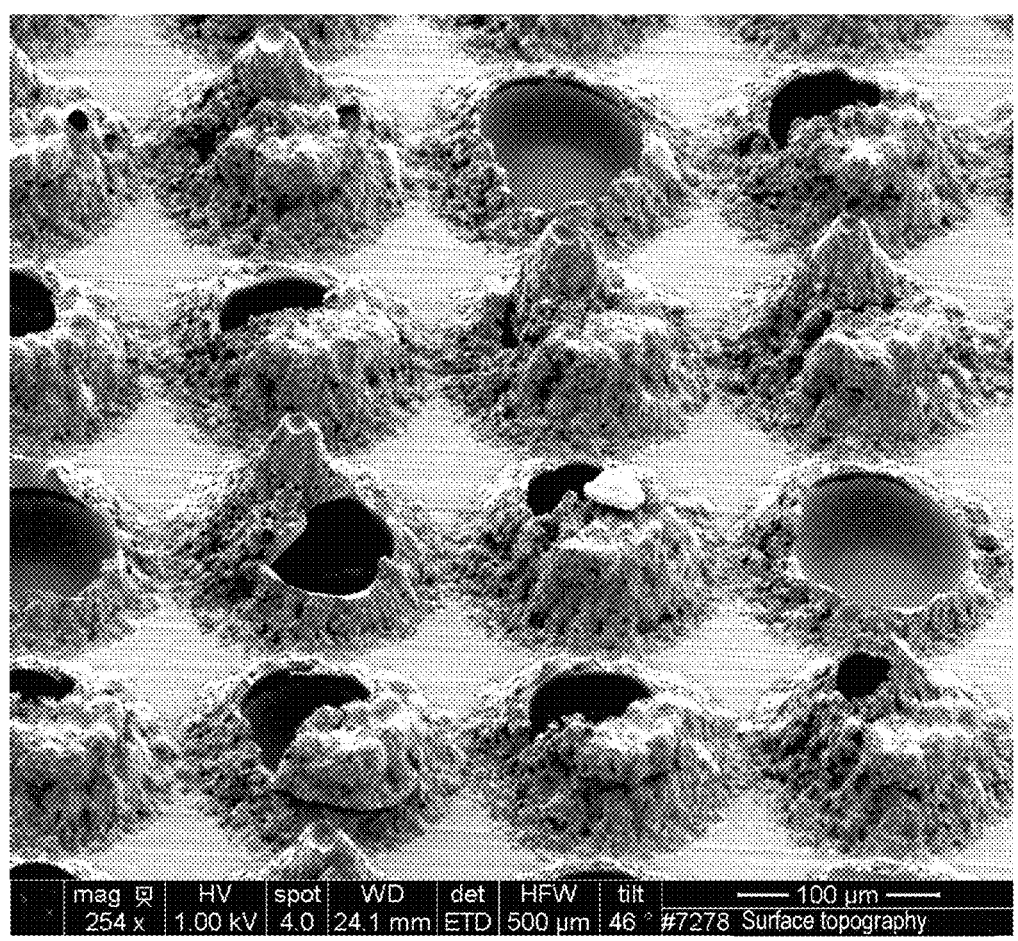
FIG. 3 shows an SEM micrograph without the pretreatment of the invention.
Figure 4:
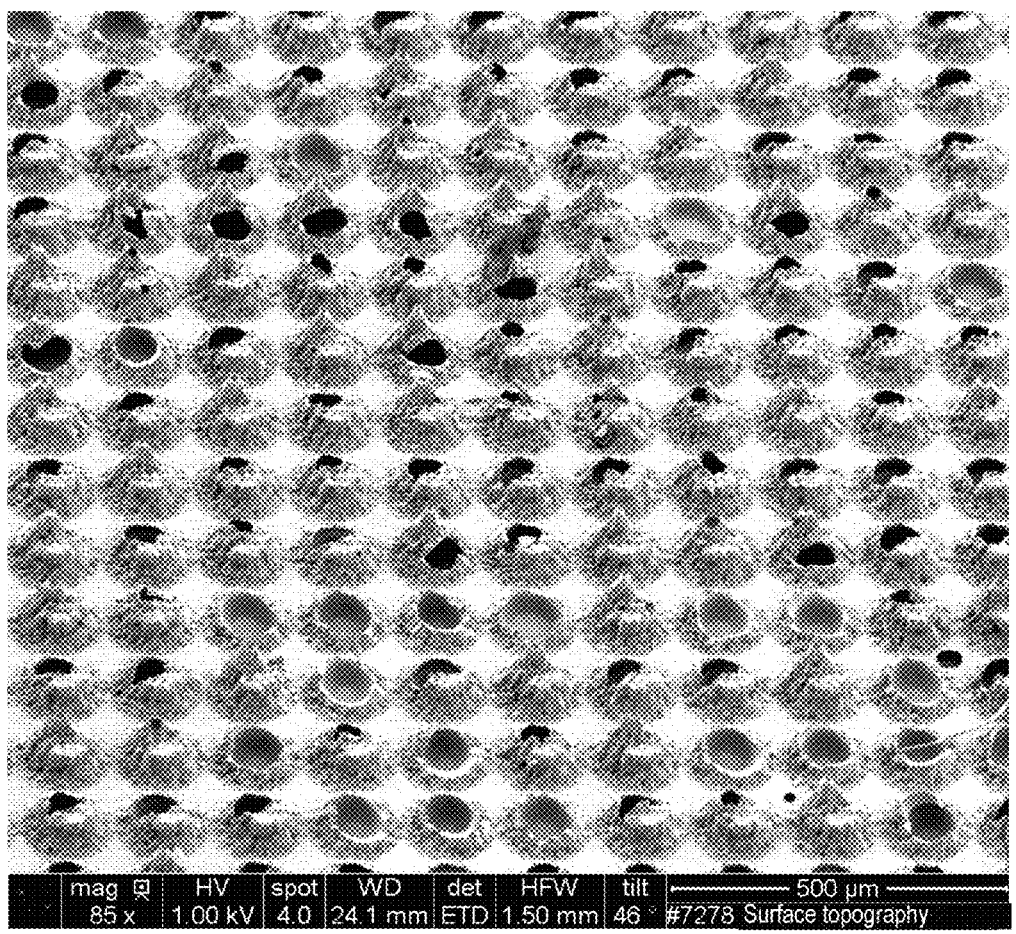
FIG. 4 shows an SEM micrograph without the pretreatment of the invention.
Figure 5:
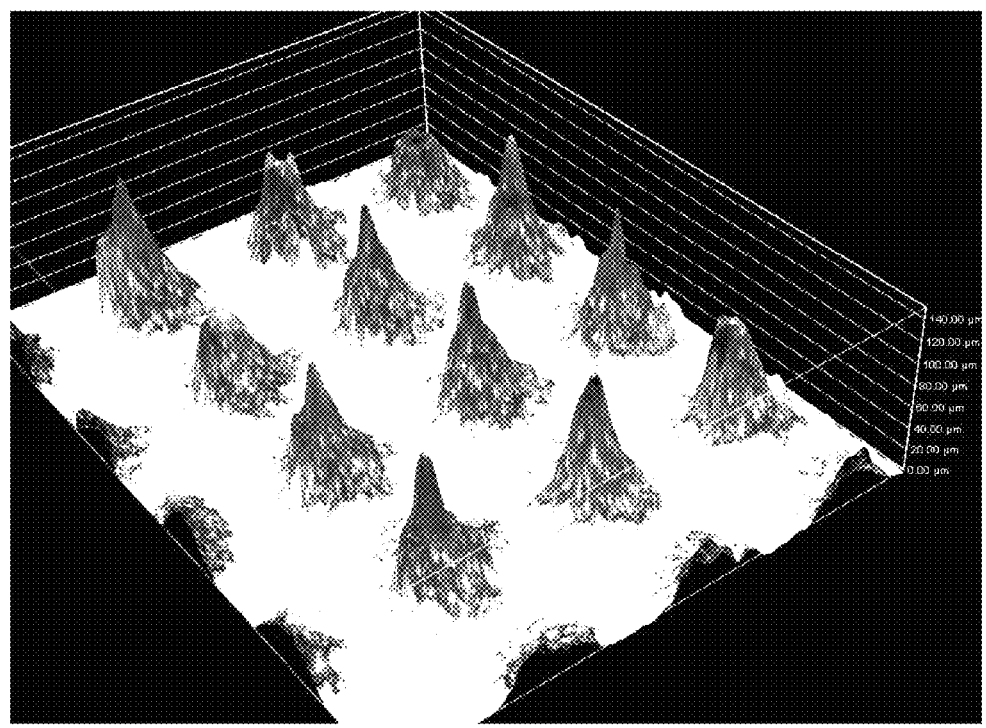
FIG. 5 shows a micrograph with the pretreatment of the invention.
Figure 6:
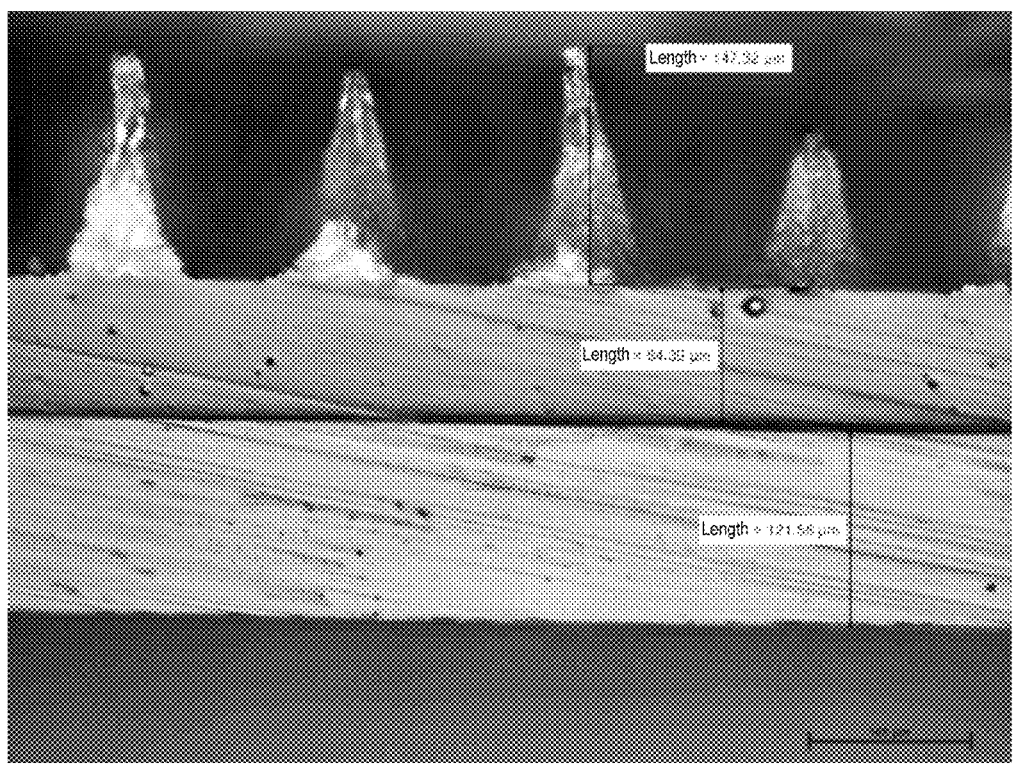
FIG. 6 shows a micrograph with the pretreatment of the invention.

It has been found that as a result of the pretreatment that has taken place, microstructures, especially with structure depths >40 µm and aspect ratios >1, can be transferred onto the coating composition to be embossed, with a very high impression accuracy even at high speed, without any loss in depth of modulation during embossing. This is also the case, and especially, for those structures whose individual structural elements are not joined to one another but instead are present at least partially in the form of individual "holes" on the surface of the embossing die of the embossing tool. Although in the case of such an arrangement of the structural elements within the embossing die, during the embossing operation, the air is unable to escape to the sides, but must instead be displaced from the individual structural elements ("holes"), the method of the invention enables defect-free transfer of the embossed structure, in particular without cratering. Unwanted cratering of this kind in the form of air bubbles, which may occur without the pretreatment of the invention, is apparent from the SEM micrographs of FIG. 3 and FIG. 4. In contrast, with the pretreatment of the invention, such cratering is avoided, as is evident from the micrographs of FIG. 5 and FIG. 6.

The invention claimed is:

1. A method for transferring an embossed structure using an embossing tool, which comprises at least the steps (1-*i*) applying a coating composition to at least a part of a surface of a substrate, to give a composite, and (2-*i*) at least partially embossing the coating composition, applied at least partially to the surface of the substrate, by means of at least one embossing tool comprising at least one embossing die, or (1-*ii*) applying a coating composition to at least a part of an at least partially embossed surface of an embossing die of an embossing tool and (2-*ii*) applying a substrate to at least a part of the surface of the coating composition, applied to the embossing die, to give a composite on the embossing die, which comprises pretreating the at least one embossing die of the embossing tool, before the implementation of step (2-*i*) and before the implementation of step (1-*ii*), with at least one organic solvent and/or at least one reactive diluent, and, through step (2-*i*) and step (1-*ii*), transferring microstructures having a structure depth >30 µm as embossed structure onto the coating composition;

wherein a solids content of the coating composition is ≥90 wt %, based on a total weight of the coating composition.

2. The method as claimed in claim 1, wherein the pretreatment to be carried out before implementation of step (2-*i*) and step (1-*ii*) comprises wetting the at least one embossing die with at least one organic solvent and/or at least one reactive diluent.

3. The method as claimed in claim 1, wherein the pretreatment to be carried out before implementation of step (2-*i*) and step (1-*ii*) takes place using at least one ultrasonic nozzle.

4. The method as claimed in claim 1, wherein the at least one organic solvent used for the pretreatment is selected from the group consisting of $C_1$-$C_4$ alcohols, and the at least one reactive diluent used for the pretreatment is selected from the group consisting of monofunctional, difunctional, trifunctional and polyfunctional (meth)acrylates and also mixtures thereof.

5. The method as claimed in claim 1, wherein through step (2-*i*) and step (1-*ii*) microstructures and/or nanostructures are transferred as embossed structure onto the coating composition.

6. The method as claimed in claim 1, wherein through step (2-*i*) and step (1-*ii*) microstructures having a structure depth >40 μm are transferred as embossed structure onto the coating composition.

7. The method as claimed in claim 1, wherein an aspect ratio of the embossed structure transferred by step (2-*i*) and step (1-*ii*) onto the coating composition is >1.

8. The method as claimed in claim 1, wherein a coating obtainable from the coating composition, and the at least one embossing die of the embossing tool, have embossed structures which are mirror images of one another.

9. The method as claimed in claim 1, which comprises, after implementation of step (2-*i*) and of step (1-*ii*), at least one further step
   (3) at least partially curing the at least partially embossed coating composition, obtained after step (2-*i*) or step (1-*ii*), to give a composite composed of the substrate and of at least partially embossed and at least partially cured coating, wherein throughout a duration of the at least partial curing, the coating composition is in contact with the at least one embossing die of the at least one embossing tool, and
   optionally comprises a step
   (4) removing the composite obtained after step (3) from the at least one embossing die of the embossing tool.

10. The method as claimed in claim 1, wherein the coating composition is a coating composition which is curable by radiation.

11. The method as claimed in claim 1, wherein the coating composition comprises at least one component which comprises at least one carbon double bond and which is present therein in an amount in a range from 40 to 95 wt %.

12. The method as claimed in claim 1, wherein the coating composition comprises at least one monofunctional, difunctional, trifunctional and/or polyfunctional (meth)acrylate.

13. The method as claimed in claim 1, wherein the substrate is a film web.

14. The method as claimed in claim 1, wherein the substrate is a moving film web.

15. A method of using an embossing tool comprising at least one embossing die, the method comprising using the embossing tool for transferring an embossed structure to at least a part of a surface of a coating composition, wherein the at least one embossing die of the embossing tool has been pretreated, before the transfer, with at least one organic solvent and/or at least one reactive diluent, and the embossed structure transferred onto the coating composition comprises microstructures having a structure depth >30 μm, wherein a solids content of the coating composition is ≥90 wt %, based on a total weight of the coating composition.

16. A method for transferring an embossed structure using an embossing tool, which comprises at least the steps
   (1-*i*) applying a coating composition to at least a part of a surface of a substrate, to give a composite, and
   (2-*i*) at least partially embossing the coating composition, applied at least partially to the surface of the substrate, by means of at least one embossing tool comprising at least one embossing die,
   or
   (1-*ii*) applying a coating composition to at least a part of an at least partially embossed surface of an embossing die of an embossing tool and
   (2-*ii*) applying a substrate to at least a part of the surface of the coating composition, applied to the embossing die, to give a composite on the embossing die,
   which comprises pretreating the at least one embossing die of the embossing tool, before the implementation of step (2-*i*) and before the implementation of step (1-*ii*), with at least one organic solvent and/or at least one reactive diluent, and, through step (2-*i*) and step (1-*ii*), transferring microstructures having a structure depth >30 μm as embossed structure onto the coating composition;
   wherein the at least one organic solvent used for the pretreatment is selected from the group consisting of $C_1$-$C_4$ alcohols, and the at least one reactive diluent used for the pretreatment is selected from the group consisting of monofunctional, difunctional, trifunctional and polyfunctional (meth)acrylates and also mixtures thereof.

17. The method as claimed in claim 16, wherein a solids content of the coating composition is ≥90 wt %, based on a total weight of the coating composition.

* * * * *